Feb. 9, 1971  D. N. RENNEKER  3,561,819
RESTRAINT APPARATUS
Filed Sept. 26, 1967  3 Sheets-Sheet 1
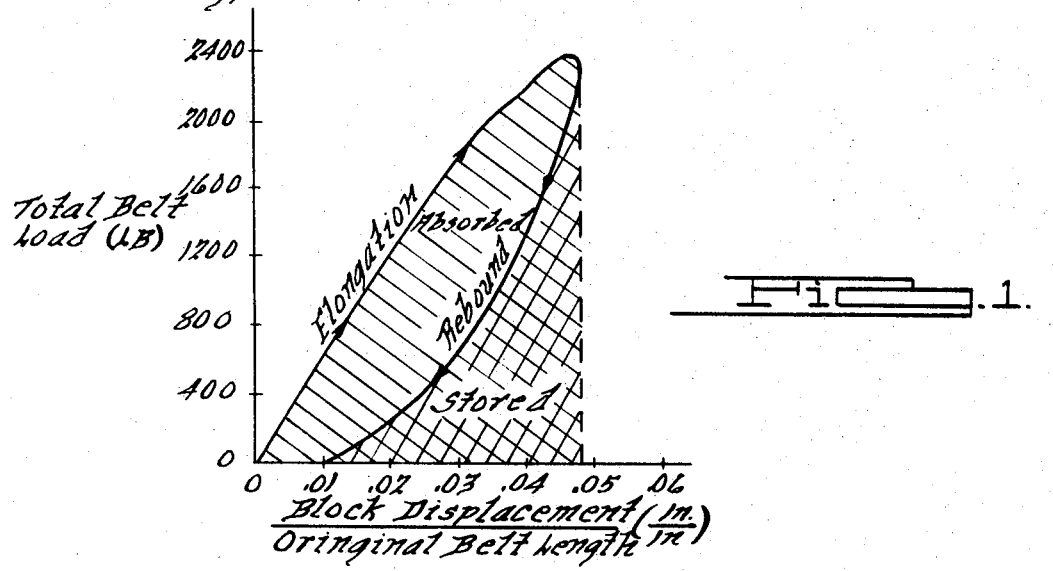
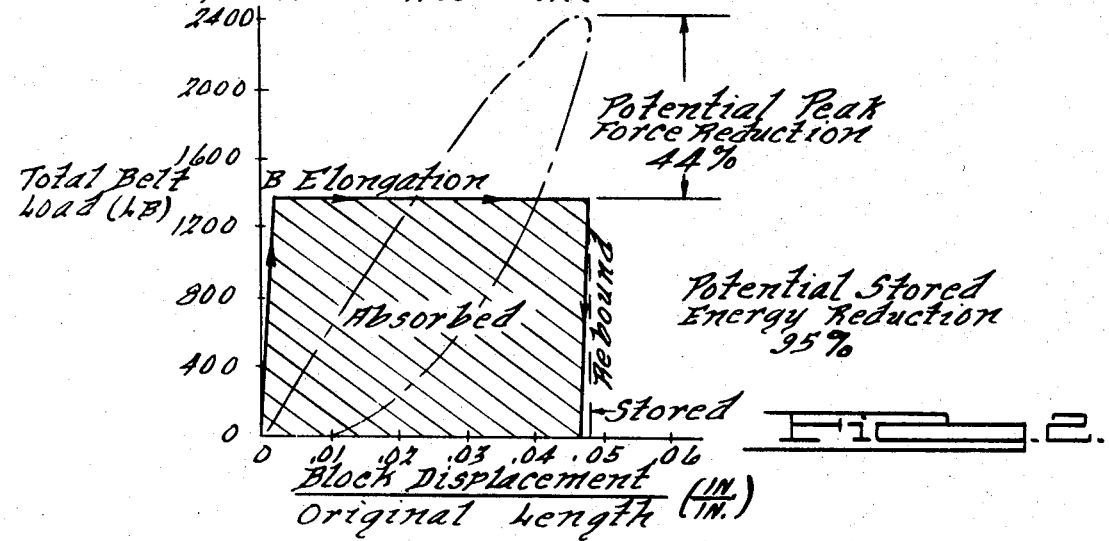
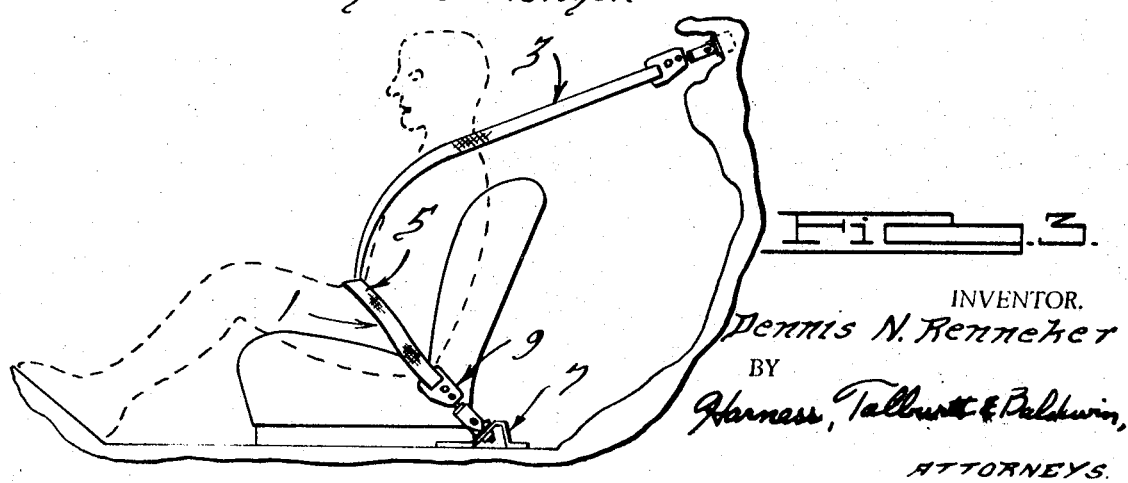
INVENTOR.
Dennis N. Renneker
BY
Harness, Talburtt & Baldwin,
ATTORNEYS.

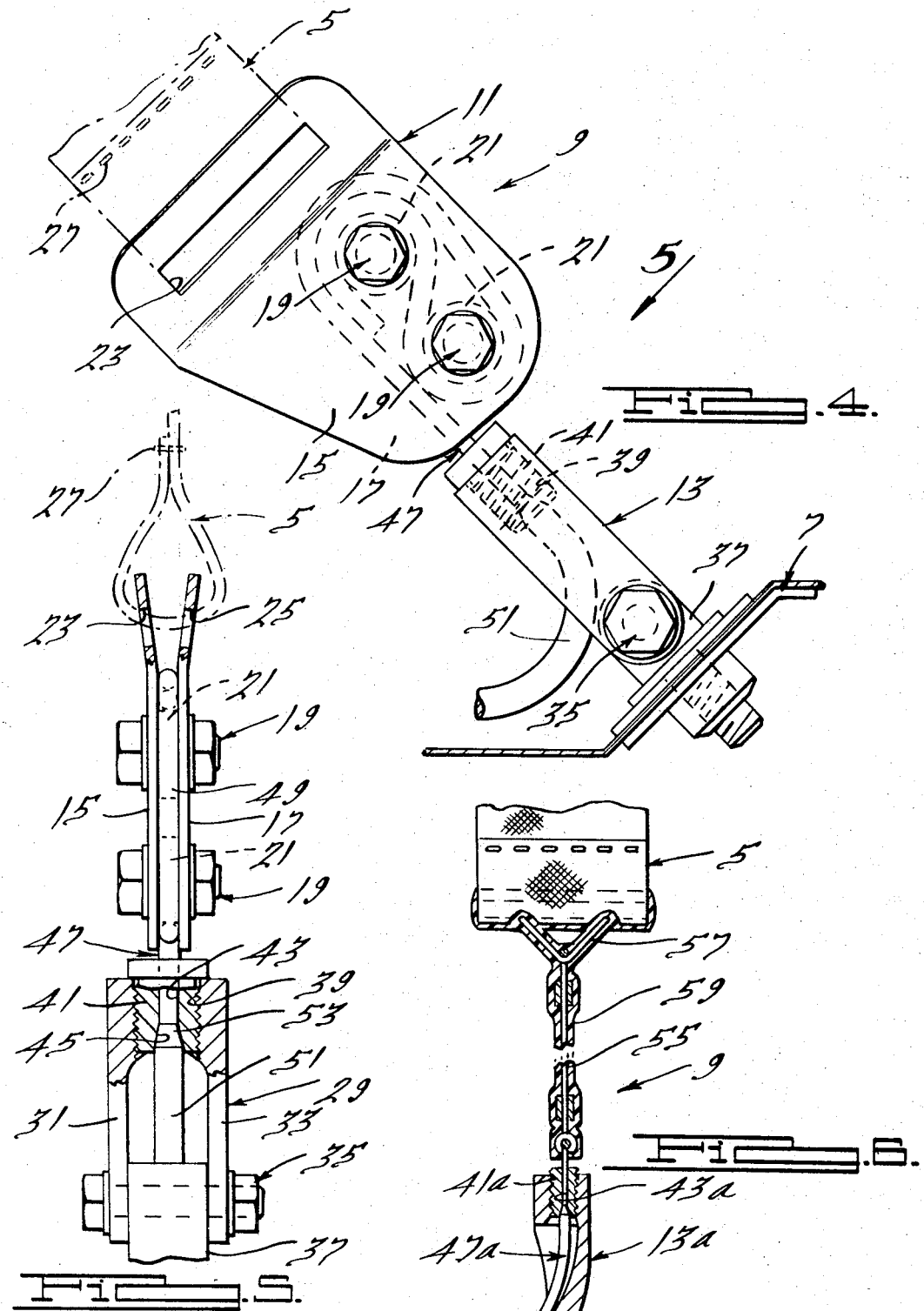

Feb. 9, 1971  D. N. RENNEKER  3,561,819
RESTRAINT APPARATUS
Filed Sept. 26, 1967  3 Sheets-Sheet 3
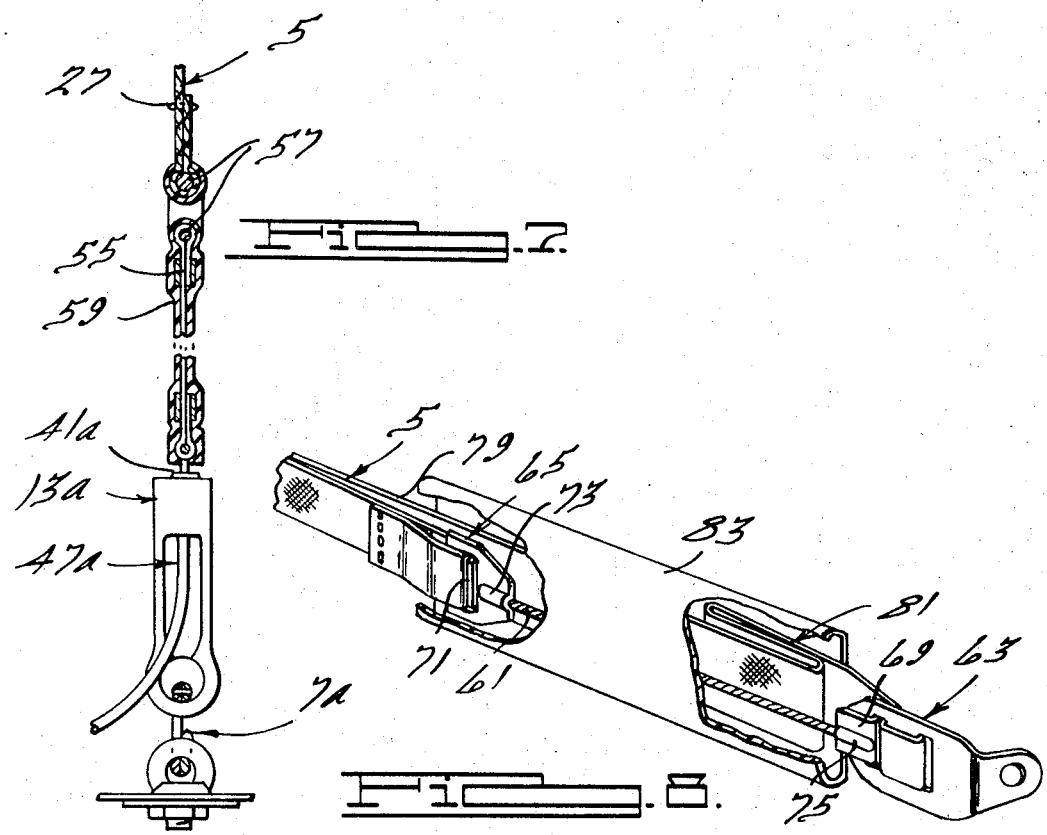
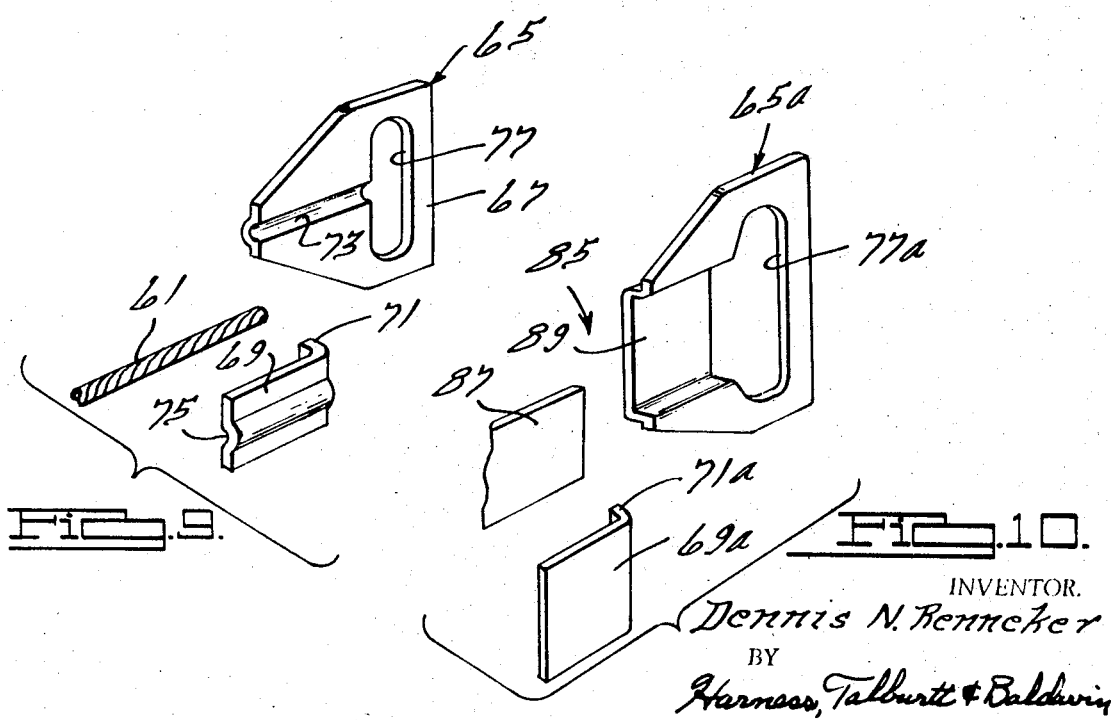
INVENTOR.
Dennis N. Renneker
BY
Harness, Talburtt & Baldwin,
ATTORNEYS.

United States Patent Office 3,561,819
Patented Feb. 9, 1971

1

3,561,819
RESTRAINT APPARATUS
Dennis N. Renneker, Warren, Mich., assignor to Chrysler Corporation, Highland Park, Mich., a corporation of Delaware
Filed Sept. 26, 1967, Ser. No. 670,638
Int. Cl. A62b 35/60
U.S. Cl. 297—386                      4 Claims

ABSTRACT OF THE DISCLOSURE

Energy absorbing restraint system for a passenger in a vehicle including, in one embodiment, a wire adapted to be drawn through a die and reduced in diameter as it is so drawn to absorb kinetic energy transferred from the passenger to the restraint system upon impact. Other embodiments include energy absorbing cable and cable strands adapted to elongate a substantial amount without breaking to absorb energy.

BACKGROUND OF THE INVENTION

This invention relates to restraint systems, and more particularly to a restraint system for a passenger in a vehicle.

When an automobile becomes involved in a frontal collision, the impact forces tend to collapse the forstructure of the vehicle and decelerate the passenger compartment. If no external forces other than seat friction are applied to a passenger, he will continue to move forward at substantially pre-impact velocity. A passenger traveling at a substantially constant speed within a decelerating passenger compartment will impact the interior of the compartment causing what is commonly referred to as the "second collision" or the "secondary impact."

Obviously, the basic objective of any passenger restraint system is to apply decelerating forces to the passenger sufficient to reduce his velocity to that of the vehicle before a secondary collision or impact takes place. A lap belt can serve this function for the hips and legs, but such a belt leaves the upper torso free to swing forward and possibly to impact some interior surfaces. A lap and shoulder belt harness combination, however, can be made to eliminate secondary impact with substantially all interior surfaces for a given range of collision situations.

Prior to impact, a passenger has kinetic energy due to his velocity. To bring the passenger to rest, this energy must be transferred or absorbed. A restraint system can transfer the kinetic energy from the passenger in three ways. One, while the vehicle is still in motion, the restraint system can transfer some of the energy to the vehicle, where it is absorbed in structural crush. The remaining energy is transferred to the restraint system itself which absorbs some of the energy and stores the rest of it. After the passenger's forward velocity is terminated, the energy stored in many of the present restraint systems may be elasticity returned causing the passenger to rebound. This may occur because the restraint system elongates during the transfer of energy from the passenger to the system in a manner generally similar to a linear spring. After bringing the passenger to rest, the restraint system may rebound at a reduced load. Also during deceleration, the load on the passenger from the belt increases from 0 to a relatively high figure, such as 2,400 lbs., for example. Naturally, it would be desirable to reduce the peak load to which the passenger is subjected as well as the rebound caused by such restraint systems.

SUMMARY OF THE INVENTION

Briefly, a restraint system constructed in accordance with this invention includes a belt assembly adapted to extend across and in front of a vehicle passenger, anchor members secured to said vehicle, said belt assembly including means adapted to absorb energy upon elongation thereof, said anchor members being adapted for connection of ends of said belt assembly thereto.

One of the primary objects of this invention is to provide a restraint system for a vehicle passenger which is adapted to arrest the forward motion of the passenger, as is accomplished with present belt restraint systems, without subjecting the passenger to the peak loads to which a passenger is subjected with present belt restraint systems.

A further object of this invention is to provide a restraint system for a passenger in a vehicle, the restraint system being adapted to absorb a significant portion of the energy transferred thereto from the passenger during rapid or sudden deceleration of the vehicle.

Another object of this invention is to provide a restraint system of the class described which is adapted to possess substantially the same arresting capacity as conventional systems, i.e., it is adapted to stop substantially the same mass from the same speed in substantially the same distance as conventional systems, but develops a much lower peak force and stores substantially less rebound energy.

A further object of this invention is to provide a restraint system of the type described which, in one embodiment, is adapted to absorb the energy at points adjacent the anchor member which connect the system to the vehicle.

Another object of this invention is to provide a restraint system such as described which is economical in construction and efficient in operation.

Other objects and advantages will be made apparent as the description progresses.

BRIEF DESCRIPTION OF THE DRAWINGS

In the accompanying drawings, in which several of various possible embodiments are illustrated.

FIG. 1 is a graphical illustration of the dynamic force-deflection characteristics of a typical nylon belt restraint;

FIG. 2 is a graphical illustration of the dynamic force-deflection characteristics of an idealized restraint system which are sought by a restraint system of this invention;

FIG. 3 is a side elevation of a vehicle passenger restraint with one embodiment of this invention;

FIG. 4 is an enlarged fragmentary view of FIG. 3;

FIG. 5 is a view of FIG. 4, looking in the direction of arrow 5—5, certain parts being broken away and shown in section;

FIG. 6 is a fragmentary view of a second embodiment of this invention;

FIG. 7 is a side view of FIG. 6;

FIG. 8 is a perspective view of a third embodiment of this invention;

FIG. 9 is a perspective view of certain parts of the embodiment shown in FIG. 8; and FIG. 10 is a perspective view similar to FIG. 9 illustrating parts of another embodiment of this invention.

Like parts are indicated by corresponding reference characters throughout the drawings.

DESCRIPTION OF THE PREFERRED EMBODIMENTS

Referring now to the drawings, FIG. 1 illustrates the dynamic force-deflection characteristics of a typical nylon belt. The data shown therein, published by L. M. Patrick of Wayne State University at the 10th Stapp Car Crash Conference, Holloman Air Force Base, N.M. Nov. 8–9, 1966, was obtained by arresting a 186 lb. body block from a velocity of 23 ft./sec. with a standard automotive seat belt. The curve indicates that during elongation, the belt acts essentially as a linear spring (displacement proportional to force) with the peak belt load being approximately 2,400 lbs. After the block is brought to rest, the belt rebounds at reduced loads. The area enclosed by the loop (single lined) represents the energy of the moving block which is transferred to and absorbed by the belt. The area under the loop (double lined) represents the energy which is transferred from the block to the belt during deceleration and then is returned to the block as rebound. It will be seen that it is desirable to reduce this rebound energy.

It is desirable that the passenger be kept from contacting interior surfaces, that peak loads on the restraint system be reduced, and that the energy stored in the belt during deceleration be minimized. The force-deflection characteristics of a restraint system idealized to the above desired objectives are shown in FIG. 2. Ideally, a restraint should elongate at a substantially constant force, rather than as a linear spring. As a result, most of the energy of the moving passenger or block is absorbed, rather than stored, by the restraint during deceleration. Very little of the energy transferred to the restaint is stored for rebound. The overall advantage of the idealized restraint is that it can be made to have the same arresting characteristics, i.e., it can stop the same mass from the same velocity in the distance, as a standard restraint, but the idealized restraint develops a substantially lower peak force and stores substantially less energy for rebound than a standard restraint. The restraint system of this invention approaches the performance of such an idealized system.

As shown in FIG. 3, a restraint system may include a lap belt assembly 1 and a shoulder belt assembly 3. However, it will be understood that a restraint system might be formed of either assembly individually. The essential components of both assemblies are similar and a description of one will suffice for both.

Assembly 1 includes a belt portion 5 formed of two belt sections (only one of which is shown) adapted to be connected together by a buckle (not shown).

The belt sections should be relatively strong and may be formed of a plurality of nylon webs of the type conventionally used in restraint systems. If desired, several webs, for example, may be sewn together to increase the tensile strength of the belt portion 5. The opposite ends of belt portion 5 are connected to anchors 7 attached to the vehicle by an energy absorption device 9.

Referring now to FIG. 4, an energy absorption device 9 includes a connector or wire carrier 11 and a connector or die carrier 13. Carrier 11 has two side plates 15 and 17 connected together by two fasteners 19 such as bolt and nut assemblies, spaced apart from one another. Spacers 21 surround fasteners 19 between plates 15 and 17 for holding the latter apart.

Slots 23 and 25 are provided in the outer ends of plates 15 and 17, respectively. The end of belt portion 5 extends through slots 23 and 25 and is secured to an intermediate section of the belt portion 5 as indicated at 27.

Die carrier 13 includes a clevis 29, the legs 31 and 33 of which are connected by a pin assembly 35 to a clamp 37 attached to anchor 7. The outer end of clevis 29 has a threaded bore 39 in which a die member 41 is threaded. Die member 41 has a bore 43 therein which tapers outwardly adjacent its inner end as indicated at 45.

A steel wire 47 having a first portion 49 of one diameter and a second portion 51 of a larger diameter extends through die member 41 and is connected to the end of belt portion 9. More particularly, the portion 49 of wire 47 extends around the spacers 21 between side plates 15 and 17 so that the wire is securely connected to the wire carrier 11. The inner end of portion 49 of wire 47 extends through the untapered portion of bore 41. Wire 47 is then tapered outwardly as indicated at 53 to the inner end of portion 51 of the wire. Tapered portion 53 of the wire nests in the tapered portion 45 of bore 43. It will be understood that die member 41 and wire 47 are assembled together before the portion 49 is bent to the position necessary for assembly of the side plates 15 and 17, fasteners 19 and spacers 21. The free end of portion 51 of wire 47 is bent away from pin assembly 35.

Operation of the seat belt restraint shown in FIGS. 3, 4 and 5 is as follows:

Assuming the belt 5 is tightened across the passenger's lap, sudden deceleration of the vehicle causes the kinetic energy of the moving passenger to be transferred to the belt assembly. If the belt is constructed of a single web of conventional belt material, the belt will elongate linearly initially as shown in FIG. 1 until the load reaches a point at which the wire 47 will be drawn through the die member 41. This point may occur when the load reaches 1,400 lbs. for example. The length of the belt per se does not continue to increase, but elongation does take place, and this elongation occurs in the wire 47 as the latter is drawn through the die member. The load on the belt and passenger remains relatively constant as the energy is absorbed in the transformation of the large diameter wire portion to the small diameter wire portion as the wire is drawn through the die member. Thus, the passenger is not subjected to the high peak loads accompanying the use of conventional seat belts. When the passenger's forward motion is arrested, the force deflection curve will return to zero on the vertical scale of the graph along a line generally parallel with the curve during initial loading from zero to load point at which the wire 47 began to be drawn through the die member 41. The area under the return curve represents the stored energy of the belt portion 9 per se and will, of course, be returned to the passenger as rebound. However, it will be understood that such rebound energy will be significantly less than the rebound energy of conventional belts shown in FIG. 1. In any event, the peak load on the passenger will be reduced considerably.

It will be understood that by increasing the strength of the belt portion 5, the portion of the force deflection curve between 0 and the point at which the wire begins to draw can be brought from the line OA (the broken line force deflection curve in FIG. 2) toward the line OB. This increased strength of belt portion 5 prevents any significant stretching of the belt and reduces the amount of energy which may be stored in the belt during deceleration.

A modified embodiment of this invention is shown in FIGS. 6 and 7. The die carrier of energy absorbing device 9 is designated 13a and is attached to a floor anchor 7a. A die member 41a is threaded in the outer end of carrier 13a and has a bore 43a formed in the same shape as bore 43. A wire 47a extends through bore 43 in the same manner as wire 47. However, rather than being connected to a wire carrier, wire 42a is attached to one end of a flexible cable 55. The other end of cable 55 is attached to a connector 57 secured, as by stitching, for example, to belt portion 5. A soft plastic coating 59 is provided around cable 55 and the adjoining portion of connector 57. The operation of the embodiment shown in FIGS. 6 and 7 is similar to the operation of the embodiment shown in FIGS. 4 and 5. However, the cable 55 of the FIGS. 6 and 7 embodiment requires less hardware and has more flexibility than the embodiment of FIGS. 4 and 5.

Another embodiment of this invention is shown generally at 61 in FIGS. 8 and 9. This embodiment employs a so-called energy absorption stainless steel cable sold by American Standard Chain and Cable, Inc. Conventional strand cables are normally capable of very little elongation under tension break. For example, a conventional cable may elongate only 2% to 3% before breaking. Accordingly, very little energy is absorbed by conventional cable prior to breakage. The so-called energy absorption cable referred to above is capable of a significant amount of elongation, i.e., absorption of energy, before breakage occurs. For example, a particular energy adbsorbing cable may elongate approximately 45% as the load thereon increases up to some predetermined point, while a conventional cable may only elongate 1% or 2% under a corresponding load.

The cable 61 is attached at one end to an anchor 63 adapted to be secured to the vehicle, and at the other end to a connector 65 secured to belt portion 5. More particularly, the anchor 63 and connector 65 include a first generally flat member 67 and a second generally flat member 69 having a lip 71 at one end. Members 67 and 69 have aligned channels 73 and 75, respectively, into which the end of cable 61 is nested when the members 67 and 69 are placed in face-to-face contact. Lip 71 extends through an opening 77 in member 67. The members 67 and 69 and cable 61 are connected together by brazing, for example, to prevent removal of the cable from the anchor 63 and connector 65. Belt portion 5 may include a supplemental portion 79 folded upon itself as indicated at 81 to provide a reserve connection between the belt portion and the anchor 63 in the event cable 61 should be elongated to the point at which it will break. Moreover, a plastic sleeve 83 may cover the cable 61 and supplement portion 79 to maintain the parts in an orderly and compact position.

Operation of the embodiment shown in FIGS. 8 and 9 is as follows:

As the load on the belt portion 5 increases upon sudden deceleration of the vehicle, the cable 61 is stretched and absorbs the energy of the decelerating passenger. The cable is not elastic, and does not store any significant amount of the energy transferred to the restraint system. Moreover, the cable begins absorbing energy, i.e., it begins to stretch, when the load on the belt portion is relatively low. The load on the belt and passenger is then maintained at the relatively low level due to the elongation of cable 61. Thus, the peak loads on the passeuger normally incurred with some nylon web restraint systems are avoided.

Another modification of this invention is illustrated at FIG. 10. This modification is generally similar to the embodiment shown in FIGS. 8 and 9, except the energy absorbing means is in the form of a plurality of strands 87 of the same material from which cable 61 is formed. The strands are located in side-by-side relationship and nest in a recess 89 in generally flat connector 65a. A generally flat member 69a having a lip 71a is adapted to overlie the strands 87 in recess 89 with lip 71a extending into an opening 77a in member 69a. Strands 87, member 65a and member 69a are adapted to be secured together by brazing, for example. It will be understood that an anchor for the FIG. 10 embodiment would have a strand connection configuration similar to connector 85.

The operation of the embodiment shown in FIG. 10 is generally the same as the embodiment shown in FIGS. 8 and 9.

It will be seen that the restraint system of this invention is adapted to arrest the forward motion of a passenger without subjecting the latter to high peak loads. Moreover, a significant portion of the energy transferred to the restraint system during rapid deceleration of the vehicle is adsorbed, rather than stored, by the restraint system.

In view of the foregoing, it will be seen that the several objects and other advantages of this invention are attained.

While several embodiments of the invention have been disclosed and described, it is apparent that other embodiments and modifications of the invention are possible within the scope of the appended claims.

I claim:

1. Restraint apparatus for restraining a passenger in a vehicle upon sudden deceleration of the vehicle comprising a belt assembly adapted to extend across and in front of the passenger, anchor means secured to the vehicle, said belt assembly being attached to said anchor means and including energy absorbing means being adapted to deform when the load placed on the belt assembly by the passenger reaches a substantially predetermined value, the energy absorbing means being substantially non-elastic and permanently deforming when the load placed on the belt assembly by the passenger reaches said substantially predetermined value, the deformation of said energy absorbing means resulting in the absorption of energy transferred to said belt assembly by the passenger upon sudden deceleration of said vehicle, said energy absorbing means including first connector means attached to said belt assembly, second connector means attached to said anchor means, a die attached to one of said connector means and a wire connected at one end to the other of said connector means, the free end of said wire extending through said die, said wire, upon sudden deceleration of the vehicle, being pulled, relative to said die, through said die, said first connector means including a pair of side plates, spacers between said side plates, fasteners holding said side plates against said spacers, said wire being trained around said spacers at said one end, said second connector means including a member having a threaded hole therein, said die being threaded into said hole and having a bore, said bore having one portion of a first diameter and a second portion tapering outwardly from said first portion, and said first portion of said bore being closer to said one end of said wire than said second portion of said bore.

2. Restraint apparatus for restraining a passenger in a vehicle upon sudden deceleration of the vehicle comprising a belt assembly adapted to extend across and in front of the passenger, anchor means secured to the vehicle, said belt assembly being attached to said anchor means and including energy absorbing means being adapted to deform when the load placed on the belt assembly by the passenger reaches a substantially predetermined value, the energy absorbing means being substantially non-elastic and permanently deforming when the load placed on the belt assembly by the passenger reaches said substantially predetermined value, the deformation of said energy absorbing means resulting in the absorption of energy transferred to said belt assembly by the passenger upon sudden deceleration of said vehicle, said energy absorbing means including connector means attached to said belt assembly, and at least one energy absorbing member attached to and extending between said connector means and said anchor means, said energy absorbing member comprising a length of cable adapted, when tension of a generally predetermined magnitude is applied thereto, to elongate a substantial percentage of its original length without breaking, said cable, upon elongating, absorbing energy transferred to said belt assembly by the passenger upon sudden deceleration of the vehicle.

3. Restraint apparatus as set forth in claim 2 wherein said anchor means includes a pair of generally flat plates located in face-to-face contact, aligned channels in the interfaces of said plates, said cable being located in said channels between said plates, said cable and plates being secured together.

4. Restraint apparatus as set forth in claim 1 wherein said wire has a first portion having a diameter approximately the same as the diameter of said one portion of said bore and located in said one portion of said bore, and said wire having a second portion having a diameter larger than the diameter of the first portion thereof and located in said second portion of said bore, the diameter of said second portion of said wire, when said wire is pulled, relative to said die, being reduced to the diameter of said first portion of said bore.

References Cited

UNITED STATES PATENTS

| | | | |
|---|---|---|---|
| 2,771,128 | 11/1956 | Doolittle | 297—386 |
| 3,089,564 | 5/1963 | Snittle | 297—386X |
| 3,232,383 | 2/1966 | Moberg | 297—386X |
| 3,424,495 | 1/1969 | Cherup | 297—385X |
| 3,446,533 | 5/1969 | Radke et al. | 297—386 |

JAMES T. McCALL, Primary Examiner